United States Patent
Ishigami et al.

(10) Patent No.: US 9,767,367 B2
(45) Date of Patent: Sep. 19, 2017

(54) OBJECT ESTIMATION APPARATUS AND OBJECT ESTIMATION METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Hirotake Ishigami, Susono (JP); Noriaki Shirai, Kariya (JP); Toshiyuki Matsubara, Gotenba (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 26 days.

(21) Appl. No.: 14/912,885

(22) PCT Filed: Aug. 20, 2014

(86) PCT No.: PCT/JP2014/071800
§ 371 (c)(1),
(2) Date: Feb. 18, 2016

(87) PCT Pub. No.: WO2015/025897
PCT Pub. Date: Feb. 26, 2015

(65) Prior Publication Data
US 2016/0203376 A1 Jul. 14, 2016

(30) Foreign Application Priority Data
Aug. 21, 2013 (JP) .................................. 2013-171774

(51) Int. Cl.
G06K 9/00 (2006.01)
G06K 9/62 (2006.01)
(Continued)

(52) U.S. Cl.
CPC ......... *G06K 9/00805* (2013.01); *B60W 30/06* (2013.01); *B60W 30/08* (2013.01);
(Continued)

(58) Field of Classification Search
USPC .......................................... 382/103, 104, 154
See application file for complete search history.

(56) References Cited

U.S. PATENT DOCUMENTS 5,109,425 A * 4/1992 Lawton ................... G06T 7/262
348/25
5,809,161 A * 9/1998 Auty .......................... G01P 3/38
340/937

(Continued)

FOREIGN PATENT DOCUMENTS

JP H08-094320 4/1996
JP 2006-078261 3/2006
(Continued)

OTHER PUBLICATIONS

"A New Control Algorithm in Intelligent Lighting System using Linear Programming" by Fumiya Kaku et al (received Dec. 20, 2010).
(Continued)

*Primary Examiner* — Ishrat I Sherali
(74) *Attorney, Agent, or Firm* — Knobbe, Martens, Olson & Bear, LLP (57) ABSTRACT

An object estimation apparatus estimates a position and a speed of an object in images based on the images taken by an image taking means from different positions. The object estimation apparatus includes a shift information taking means that takes temporal shift information of a position of a corresponding pixel from frames arranged in time series in a reference image, which is a reference between the images,
(Continued)

a parallax information taking means that takes parallax information of each corresponding pixel from the images with reference to the reference image, an estimated value taking means that estimates estimated values of the position and the speed of the object in three-dimensional space by using a filter based on the shift information taken by the shift information taking means and the parallax information taken by the parallax information taking means, a determination means that determines whether or not each of the shift information taken by the shift information taking means and the parallax information taken by the parallax information taking means is an abnormal value, and a correction means that corrects the estimated value taken by the estimated value taking means based on a determination result of the determination means. The correction means corrects the estimated value taken by the estimated value taking means by using different methods between a case where the determination means determines that the shift information taken by the shift information taking means is an abnormal value and a case where the determination means determines that the parallax information taken by the parallax information taking means is an abnormal value.

10 Claims, 7 Drawing Sheets (51) Int. Cl.
| | | |
|---|---|---|
| *G06K 9/66* | (2006.01) | |
| *B60W 30/06* | (2006.01) | |
| *B60W 30/08* | (2012.01) | |
| *G08G 1/16* | (2006.01) | |
| *G06T 7/593* | (2017.01) | |
| *G06T 7/269* | (2017.01) | |
| *G06T 7/70* | (2017.01) | |
| *G06T 7/292* | (2017.01) | |

(52) U.S. Cl.
CPC ..... *G06K 9/00201* (2013.01); *G06K 9/00335* (2013.01); *G06K 9/6215* (2013.01); *G06K 9/66* (2013.01); *G06T 7/269* (2017.01); *G06T 7/292* (2017.01); *G06T 7/593* (2017.01); *G06T 7/70* (2017.01); *G08G 1/166* (2013.01); *G06T 2200/04* (2013.01); *G06T 2207/30196* (2013.01); *G06T 2207/30252* (2013.01)

(56) References Cited

U.S. PATENT DOCUMENTS

| | | | | |
|---|---|---|---|---|
| 7,321,386 | B2* | 1/2008 | Mittal | G06K 9/00771 |
| | | | | 348/169 |
| 7,450,735 | B1* | 11/2008 | Shah | G06T 7/292 |
| | | | | 348/143 |
| 8,432,443 | B2* | 4/2013 | Nam | G06T 7/285 |
| | | | | 348/135 |
| 8,982,188 | B2* | 3/2015 | Ota | B60W 30/12 |
| | | | | 348/148 |
| 9,641,763 | B2* | 5/2017 | Bernal | H04N 5/23296 |
| 2009/0297036 | A1 | 12/2009 | Badino et al. | |
| 2013/0197736 | A1* | 8/2013 | Zhu | G05D 1/0088 |
| | | | | 701/26 |
| 2015/0172626 | A1* | 6/2015 | Martini | G06T 7/0008 |
| | | | | 348/50 |
| 2015/0235093 | A1* | 8/2015 | Shima | G06K 9/00805 |
| | | | | 382/103 |
| 2016/0140718 | A1* | 5/2016 | Ishida | G06T 7/0044 |
| | | | | 345/419 |
| 2016/0210512 | A1* | 7/2016 | Madden | G06K 9/00771 |

FOREIGN PATENT DOCUMENTS

| | | |
|---|---|---|
| JP | 2009-237845 | 10/2009 |
| NO | 2015/025897 A1 | 2/2015 |

OTHER PUBLICATIONS

"Determining Optical Flow" by B.K. P. Horn and B.G. Schunck, AI(17), No. 1-3, 1981, pp. 185-203.
"Fast detection of moving objects in complex scenarios" by Clemens Rabe, Uwe Franke, and Stefan Gehrig, Intelligent Vehicles Symposium, 2007IEEE, (Istanbul), Jun. 13, 2007, p. 398-403.
1st Group—5th Edition of "Knowledge Base" Institute of Electronics, Information and Communication Engineers, ver.1/2011.3.4, pp. 1/(23)-23/(23).
International Search Report (translated version); International Application No. PCT/JP2014/071800; filed Aug. 20, 2014; 3 pages.

* cited by examiner

⇧ TRAVEL IN A STRAIGHT LINE AT A SPEED OF 25 km/h (≒6.94m/s)

OBJECT ESTIMATION APPARATUS AND OBJECT ESTIMATION METHOD

TECHNICAL FIELD

The present invention relates to an object estimation apparatus and an object estimation method that estimate a position and a speed of an object from an image of the object.

BACKGROUND ART

For example, various detection apparatuses are proposed which take an image of a view ahead of a vehicle, such as an automobile, by a camera installed in the vehicle to detect an object, such as a pedestrian and another vehicle, based on the taken image (refer to Patent Literature 1, Non Patent Literature 1). Such detection apparatuses detect an object and measure (estimate) the distance from the vehicle (camera) to the object and movement (speed) of the object.

Obtaining the position of and speed of the object can determine whether or not the object is dangerous for the vehicle. Then, if the object may be dangerous for the vehicle, an alarm about the danger is issued to the driver, or the brake is automatically controlled, which can support the driving of the driver.

Non Patent Literature 1 discloses a method of estimating the three-dimensional position and speed of an object from images taken by two cameras. Specifically, according to the method of Non Patent Literature 1, a parallax is obtained for each pixel from the two images taken by the two cameras. In addition, a shift (optical flow) for each pixel is calculated from successive frame images taken by one of the cameras. Then, the actual position and speed of the object are estimated by a Kalman filter by using the parallaxes and the optical flows as inputs.

CITATION LIST

Patent Literature

[Patent Literature 1] WO 2006/081906

Non Patent Literature

[Non Patent Literature 1] Clemens Rabe, Uwe Franke, and Stefan Gehrig, "Fast detection of moving objects in complex scenarios", Intelligent Vehicles Symposium, 2007IEEE, (Istanbul), Jun. 13, 2007, p. 398-403.

SUMMARY OF INVENTION

Technical Problem

Incidentally, in parallaxes and optical flows obtained from images taken by a camera, an error due to the resolution of the camera, an error (tracking error) due to erroneously tracking an object, and the like are ineluctably generated. Then, if the parallaxes and optical flows including such errors (abnormal values) are inputted, a calculated estimated value of the object also includes an error.

That is, an apparatus has not been provided which, when an input value of the parallax or the optical flow is an abnormal value, can appropriately correct an estimated value calculated by a filter to estimate a state (position, speed) of an object with high accuracy.

Solution to Problem

An embodiment provides an object estimation apparatus and an object estimation method which can appropriately correct an estimated value when an abnormal value is detected in parallax information and shift information, to accurately estimate a position and a speed of an object.

An object estimation apparatus of an embodiment estimates a position and a speed of an object in images based on the images taken by an image taking means from different positions. The object estimation apparatus includes: a shift information taking means that takes temporal shift information of a position of a corresponding pixel from frames arranged in time series in a reference image, which is a reference between the images; a parallax information taking means that takes parallax information of each corresponding pixel from the images with reference to the reference image; an estimated value taking means that estimates estimated values of the position and the speed of the object in three-dimensional space by using a filter based on the shift information taken by the shift information taking means and the parallax information taken by the parallax information taking means; a determination means that determines whether or not each of the shift information taken by the shift information taking means and the parallax information taken by the parallax information taking means is an abnormal value; and a correction means that corrects the estimated value taken by the estimated value taking means based on a determination result of the determination means. The correction means corrects the estimated value taken by the estimated value taking means by using different methods between a case where the determination means determines that the shift information taken by the shift information taking means is an abnormal value and a case where the determination means determines that the parallax information taken by the parallax information taking means is an abnormal value.

BRIEF DESCRIPTION OF DRAWINGS

FIG. 3 (a) is a view of an image taken by another vehicle, which is an object, (b) is a view illustrating parallax information, (c) is a view illustrating shift information;

DESCRIPTION OF EMBODIMENTS

Next, an object estimation apparatus and an object estimation method according to an embodiment are described.

In the present embodiment, a case will be described where an automobile (passenger car), which is a vehicle, includes the object estimation apparatus.

Embodiment

Figure 1:
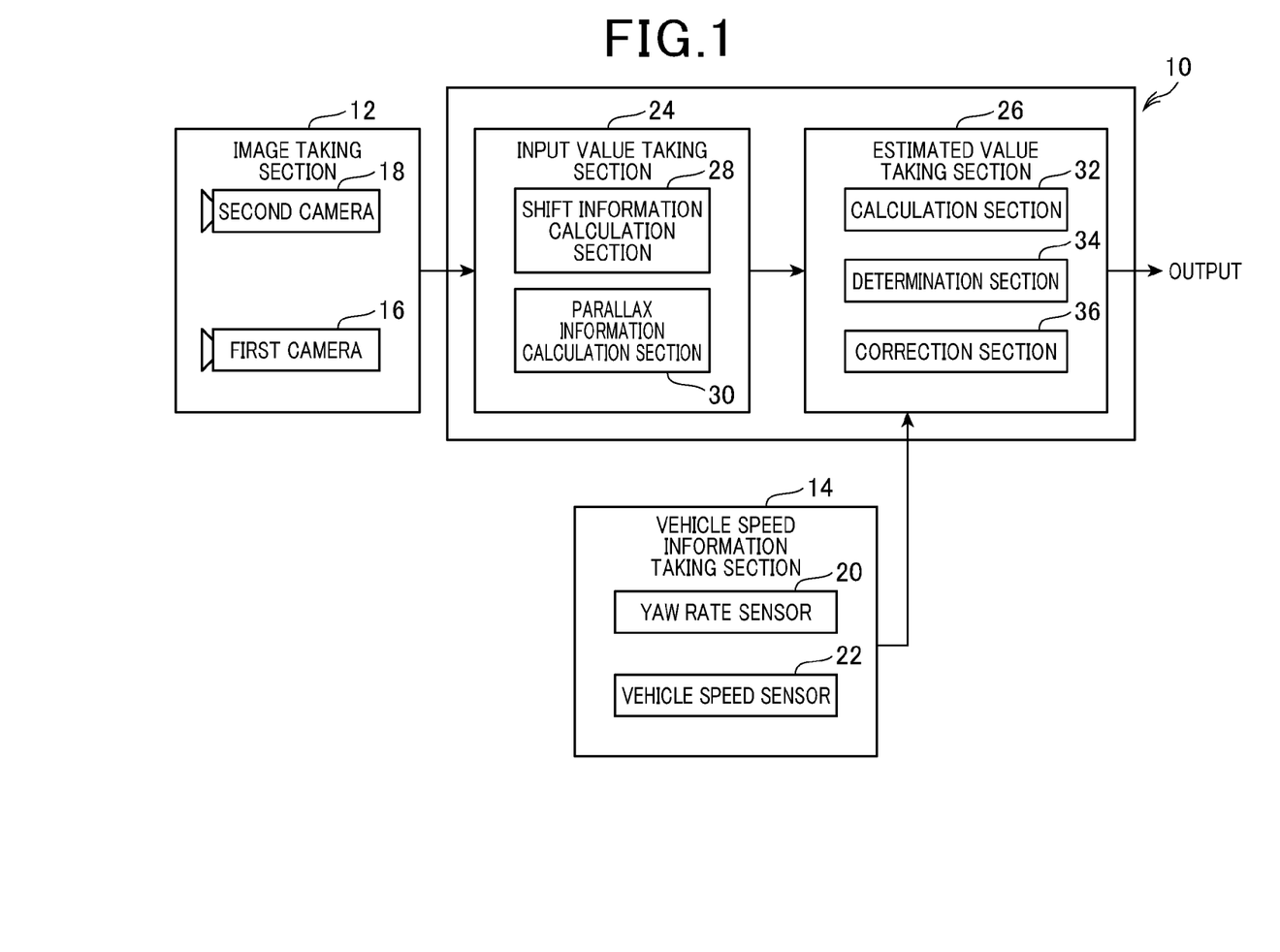
FIG. 1 is a block diagram illustrating a system configuration of an automobile including an object estimation apparatus according to an embodiment.

FIG. 1 is a block diagram illustrating a system configuration of an automobile including an object estimation apparatus 10 according to the embodiment. The object estimation apparatus 10 is electrically connected to an image taking section 12 (image taking means) and a vehicle information taking section 14. In addition, the object estimation apparatus 10 estimates a state (position and speed) of an object (e.g. another vehicle or an pedestrian) imaged by the image taking section 12 based on inputs from the image taking section 12 and the vehicle information taking section 14.

Note that the object estimation apparatus 10 is electrically connected to a drive assist apparatus, which is not shown. An estimated value of the object obtained by the object estimation apparatus 10 is output to the drive assist apparatus. In the drive assist apparatus, for example, the input estimated value is used to caution the driver about the presence of the object, or to automatically control the brake, to assist the driver in driving.

(Regarding Image Taking Section)

The image taking section 12 is mounted to, for example, the vehicle interior side of the front windshield (windshield glass) (not shown) of the automobile, and takes an image of a view ahead of and in the traveling direction of the automobile. The image taking section 12 of the present embodiment is a stereo camera including a pair of cameras 16, 18 that are apart from each other from side to side (in the horizontal direction perpendicular to the traveling direction of the automobile). Note that, hereinafter, the left camera is referred to as a first camera 16 (first imaging means), and the right camera is referred to as a second camera 18 (second imaging means).

In the first camera 16 and the second camera 18, imaging timings are synchronized to each other so that frame images are taken at the same time. The first camera 16 and the second camera 18 take images of a view ahead of and in the traveling direction of the automobile from different positions to obtain a first image (reference image) and a second image.

(Regarding Vehicle Information Taking Section)

The vehicle information taking section 14 detects a traveling state of the automobile, and includes a yaw rate sensor 20 that detects a yaw rate of the automobile and a vehicle speed sensor 22 that detects a vehicle speed (traveling speed) of the automobile. The yaw rate and the vehicle speed obtained by the vehicle information taking section 14 are outputted to an estimated value taking section 26, described later, of the object estimation apparatus 10.

(Regarding Object Estimation Apparatus)

As shown in FIG. 1, the object estimation apparatus 10 is configured based on an input value taking section 24 and an estimated value taking section 26.

(Regarding Input Value Taking Section)

The input value taking section 24 includes a shift information calculation section 28 (shift information taking means) and a parallax information calculation section 30 (parallax information taking means). The input value taking section 24 takes input values (parallax information and shift information described later) input to the estimated value taking section 26, based on the first image and the second image taken by the image taking section 12.

The shift information calculation section 28 is electrically connected to the first camera 16 and receives the first image taken by the first camera 16. In addition, the shift information calculation section 28 includes a rewritable storage section (not shown) such as a RAM, and stores the first image of the past one frame in the storage section as needed and updates the image.

The shift information calculation section 28 takes temporal shift information (optical flow) of the position of the corresponding pixel from the first image of the current frame and the first image of the past one frame stored in the storage section (frames arranged in time series).

In the embodiment, the shift information is defined as a position component u in the lateral direction (x direction) of the pixel and a position component v in the longitudinal direction (y direction) of the pixel in a state where the origin is the center of the optical axis of the first camera 16.

Note that when the shift information calculation section 28 calculates the shift information (u, v), a known method, for example, the concentration gradient method, the Horn-Schunck method (B. K. P. Horn and B. G. Schunck, Determining Optical Flow, AI(17), No. 1-3, 1981, pp. 185-203) or the like is used.

The parallax information calculation section 30 is electrically connected to both the first camera 16 and the second camera 18 and receives the first image and the second image taken by the first and second cameras 16 and 18, respectively. The parallax information calculation section 30 calculates a parallax (parallax information d) for each image based on the received first image and the second image.

Specifically, for each pixel of the first image and each corresponding pixel of the second image, the parallax information d is calculated by, for example, the image processing using Semi-Global Matching. In the embodiment, the parallax information calculation section 30 is set so as to calculate the parallax information d with reference to the first image. That is, the parallax information d is uniquely associated with the depth position of the pixel whose origin is the center of the optical axis of the first camera 16 (the distance from the first camera 16 to the object). Note that tracking each pixel between frames is performed based on the shift information (u, v) (that is, optical flow) calculated by the shift information calculation section 28.

The shift information (u, v) calculated by the shift information calculation section 28 and the parallax information d calculated by the parallax information calculation section 30 are output to the estimated value taking section 26.

As shown in FIG. 1, the estimated value taking section 26 includes a calculation section 32 (estimated value taking means), a determination section 34 (determination means), and a correction section 36 (correction means).

The calculation section 32 executes a Kalman Filter having a predetermined process model and an observation model, by using the shift information (u, v) and the parallax information d as input values, to calculate estimated values of the position and the speed of the object. Note that, in the embodiment, the calculation section 32 calculates the estimated value with reference to the first image.

Here, the calculation section 32 is set so as to calculate the estimated values not for all the pixels of the first image but for, for example, the pixels in a predetermined region of the first image except those in the periphery of the first image, to reduce the calculation amount.

Figure 2:
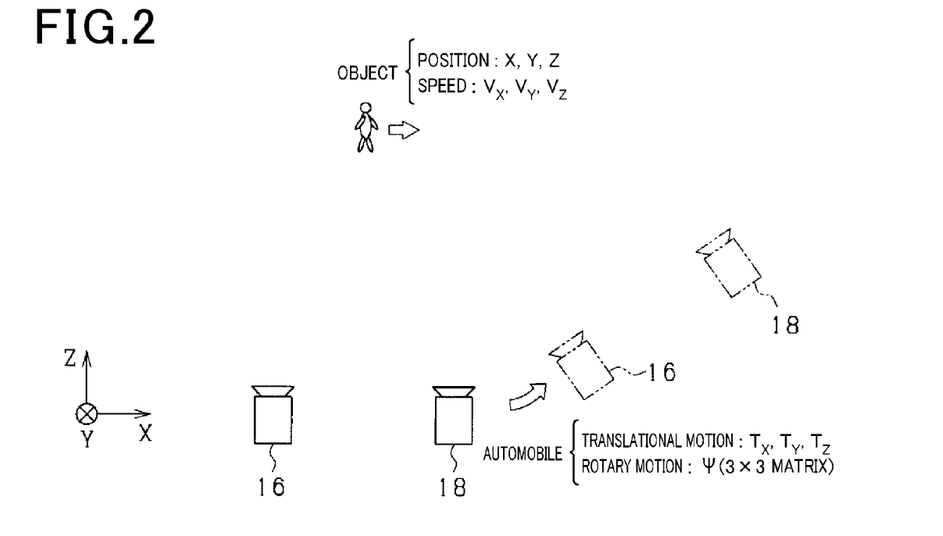
FIG. 2 is a schematic diagram illustrating a state where the object estimation apparatus according to the embodiment estimates an object.

FIG. 2 is a schematic diagram illustrating a state where the object estimation apparatus 10 estimates a state of an object. A coordinate system is set as shown in FIG. 2 in a state where the origin is the center of the optical axis of the first camera 16. The calculation section 32 estimates the position (X, Y, Z) and the speed ($V_x$, $V_y$, $V_z$) of the object. In the calculation section 32, as expressed in Expression 1, a process model is set which models the position and the speed of the object in linear uniform motion.

$$\begin{bmatrix} X_t \\ Y_t \\ Z_t \\ Vx_t \\ Vy_t \\ Vz_t \end{bmatrix} = \begin{bmatrix} \Psi^T & \Psi^T \\ 0 & \Psi^T \end{bmatrix} \begin{bmatrix} X_{t-1} \\ Y_{t-1} \\ Z_{t-1} \\ Vx_{t-1} \\ Vy_{t-1} \\ Vz_{t-1} \end{bmatrix} - \begin{bmatrix} Tx \\ Ty \\ Tz \\ 0 \\ 0 \\ 0 \end{bmatrix} + v \quad \text{[Expression 1]}$$

$$v, \quad \begin{array}{l} Tx = V_s(1 - \cos(\dot{\psi}_s \Delta t))/\dot{\psi}_s \\ Tz = V_s \sin(\dot{\psi}_s \Delta t)/\dot{\psi}_s \end{array}$$

$V_s$: vehicle speed [m/s]
$\dot{\psi}_s$: yaw rate [rad/s]
$\Delta t$: interval between frames [s]

$$\Psi = \begin{bmatrix} \cos(\dot{\psi}_s \Delta t) & 0 & \sin(\dot{\psi}_s \Delta t) \\ 0 & 1 & 0 \\ -\sin(\dot{\psi}_s \Delta t) & 0 & \cos(\dot{\psi}_s \Delta t) \end{bmatrix} \quad \text{[Expression 2]}$$

where v follows a multivariable normal distribution with an average of zero and a covariance matrix Q.

$$v \sim N(0, Q) \quad \text{[Expression 3]}$$

Note that the vehicle speed is a detection value of the vehicle speed sensor 22. The yaw rate is a detection value of the yaw rate sensor 20.

In addition, in the calculation section 32, as expressed in Expression 4, an observation model is set which defines a relationship between the parallax information d and the shift information (u, v), and the position (X, Y, Z) and the speed (Vx, Vy, Vz) of the object.

$$\begin{bmatrix} u \\ v \\ d \end{bmatrix} = [H \; 0] \begin{bmatrix} X_t \\ Y_t \\ Z_t \\ Vx_t \\ Vy_t \\ Vz_t \end{bmatrix} + w \quad \text{[Expression 4]}$$

where H is a 3D to 2D projective transformation matrix. When the focal length in the lateral direction of the first image is fx[pix], the focal length in the longitudinal direction is fy[pix], and the base line length of the first camera 16 and the second camera 18 (distance between optical axes) is B, then H is expressed as Expression 5.

$$H = \begin{bmatrix} f_x/Z & 0 & 0 \\ 0 & f_y/Z & 0 \\ 0 & 0 & f_x B/Z^2 \end{bmatrix} \quad \text{[Expression 5]}$$

This is substituted into Expression 4.

$$\begin{bmatrix} u \\ v \\ d \end{bmatrix} = \begin{bmatrix} f_x/Z & 0 & 0 \\ 0 & f_y/Z & 0 & 0 \\ 0 & 0 & f_x B/Z^2 \end{bmatrix} \begin{bmatrix} X_t \\ Y_t \\ Z_t \\ Vx_t \\ Vy_t \\ Vz_t \end{bmatrix} + w \quad \text{[Expression 6]}$$

Since Expression 6 is a non-linear function, the Kalman filter cannot be applied to Expression 6 with no change. Hence, to linearly approximate Expression 6, as expressed in Expression 7, Taylor expansion is executed around a predicted value (calculated from the process model) of the position of the object at the time t (t frame) to employ the first-order term and the preceding term.

$$\begin{bmatrix} u \\ v \\ d \end{bmatrix} = \begin{bmatrix} f_x/\tilde{Z}_t & 0 & -f_x \tilde{X}_t/\tilde{Z}_t^2 \\ 0 & f_y/\tilde{Z}_t & -f_y \tilde{Y}_t/\tilde{Z}_t^2 & 0 \\ 0 & 0 & -f_x B/\tilde{Z}_t^2 \end{bmatrix} \begin{bmatrix} X_t \\ Y_t \\ Z_t \\ Vx_t \\ Vy_t \\ Vz_t \end{bmatrix} + \quad \text{[Expression 7]}$$

$$\begin{bmatrix} f_x \tilde{X}_t/\tilde{Z}_t \\ f_y \tilde{Y}_t/\tilde{Z}_t \\ 2 f_x B/\tilde{Z}_t \end{bmatrix} + w,$$

predicted value:
$(\tilde{X}_t, \tilde{Y}_t, \tilde{Z}_t)$
Expression 7 is arranged.

$$\begin{bmatrix} u' \\ v' \\ d' \end{bmatrix} = \begin{bmatrix} u - f_x \tilde{X}_t/\tilde{Z}_t \\ v - f_y \tilde{Y}_t/\tilde{Z}_t \\ d - 2 f_x B/\tilde{Z}_t \end{bmatrix} = \quad \text{[Expression 8]}$$

$$\begin{bmatrix} f_x/\tilde{Z}_t & 0 & -f_x \tilde{X}_t/\tilde{Z}_t^2 \\ 0 & f_y/\tilde{Z}_t & -f_y \tilde{Y}_t/\tilde{Z}_t^2 & 0 \\ 0 & 0 & -f_x B/\tilde{Z}_t^2 \end{bmatrix} \begin{bmatrix} X_t \\ Y_t \\ Z_t \\ Vx_t \\ Vy_t \\ Vz_t \end{bmatrix} + w$$

where w follows a multivariable normal distribution with an average of zero and a covariance matrix R.

$$w \sim N(0, R) \quad \text{[Expression 9]}$$

The calculation section 32 executes the Kalman filter based of the process model and the observation model. That is, as described below, the calculation section 32 repeats prediction (Expression 12 to Expression 14) based on the process model and updating (Expression 15 to Expression 20) based on the observation model with reference to the first image, for each frame. Hence, the calculation section 32 estimates a state (position, speed) of the object. The covariance matrixes of the estimated value at a t frame of the Kalman filter and an error of the estimated value are respectively expressed by Expression 10 and Expression 11.

$$\hat{x}_t = [\hat{X}_t, \hat{Y}_t, \hat{Z}_t, \hat{V}x_t, \hat{V}y_t, \hat{V}z_t]^T \quad \text{[Expression 10]}$$

$$\hat{P}_t = \text{cov}(x_t - \hat{x}_t) \quad \text{[Expression 11]}$$

$x_t$ of Expression 11 is a true value of the state (position, speed) of the object.

[Prediction]

$$F_t = \begin{bmatrix} \Psi^T & \Psi^T \\ 0 & \Psi^T \end{bmatrix}$$ [Expression 12]

(from a process model)

$$\tilde{x}_t = F_t \hat{x}_{t-1} - \begin{bmatrix} Tx_t \\ Ty_t \\ Tz_t \\ 0 \end{bmatrix}$$ [Expression 13]

(predicted value)

$$\tilde{P}_t = F_t \hat{P}_{t-1} F_t^T + Q$$ [Expression 14]

(covariance matrix of an error of the predicted value) [Updating]

$$J_t = \begin{bmatrix} f_x/\tilde{Z}_t & 0 & -f_x\tilde{X}_t/\tilde{Z}_t^2 & \\ 0 & f_y/\tilde{Z}_t & -f_y\tilde{Y}_t/\tilde{Z}_t^2 & 0 \\ 0 & 0 & -f_xB/\tilde{Z}_t^2 & \end{bmatrix}$$ [Expression 15]

(from an observation model)

$$g_t = \begin{bmatrix} u'_t \\ v'_t \\ d'_t \end{bmatrix} - J_t \tilde{x}_t$$ [Expression 16]

(residual error between an observation value and the predicted value)

$$S_t = J_t \tilde{P}_t J_t^T + R$$ [Expression 17]

(covariance matrix of the residual error)

$$K_t = \tilde{P}_t J_t^T S_t^{-1}$$ (Karman gain) [Expression 18]

$$\hat{x}_t = \tilde{x}_t + K_t g_t$$ (estimated value) [Expression 19]

$$\hat{P}_t = (I - K_t J_t) \tilde{P}_t$$ [Expression 20]

(Covariance Matrix of an Error of the Estimated Value)

In the calculation section 32, an initial value of the estimated value (Expression 21) and an initial value regarding the covariance matrix of an error of the estimated value are previously set to perform the above prediction and updating.

initial value of the estimated value: $\hat{X}_0$ [Expression 21]

initial value of the covariance matrix of an error of the estimated value: $\hat{P}_0$ [Expression 22]

As these initial values, an appropriate constant may be set, or a value determined by a simulation, an experiment, or the like may be employed depending on the model and the condition for executing the Kalman Filter.

The determination section 34 determines whether or not the shift information (u, v) calculated by the shift information calculation section 28 and the parallax information d calculated by the parallax information calculation section 30 are abnormal values. Hereinafter, a specific example of the case is described where abnormal values of the shift information (u, v) and the parallax information d are generated.

As shown in FIG. 3(a), an automobile (hereinafter, referred to as another vehicle 38) traveling ahead of and in the traveling direction of the automobile including the object estimation apparatus 10 is defined as an object, and a case is assumed where the object estimation apparatus 10 performs state estimation. FIG. 3(b) illustrates the parallax information d at t−1 frame, t frame, and t+1 frame calculated by the parallax information calculation section 30.

Circular encircling lines marked in the frames of FIG. 3(b) indicate pixels (tracking points) which have been subject to normal tracking (i.e. appropriate calculation of shift information). As understood from FIG. 3(b), regardless of the same portion of the object, the parallax information d of the pixels inside the encircling lines changes from t−1 frame to t frame. In addition, in t+1 frame, it can be understood that the parallax information d is modified. That is, in t frame, the parallax information d of the pixels inside the encircling line calculated by the parallax information calculation section 30 has an abnormal value (outlier) displaced from the true value.

Such an abnormal value is generated due to influence of noise in the first image and the second image, an error generated due to the images divided by finite pixels, and the like. Meanwhile, the parallax information d is modified in t+1 frame due to the parallax information d independently calculated for frames by the parallax information calculation section 30. That is, the parallax information calculation section 30 calculates the parallax information d without depending on the parallax information d calculated in the past. Hence, even if an abnormal value has been generated once in the parallax information d, the parallax information d is appropriately calculated in t+1 frame.

FIG. 3(c) illustrates shift information (u, v) in t'−1 frame, t' frame, and t'+1 frame calculated by the shift information calculation section 28. In the portions marked with encircling lines in t' frame, tracking points have moved from the another vehicle 38 to a view (side wall) other than the another vehicle 38 or another vehicle 40. That is, the shift information (u, v) calculated by the shift information calculation section 28 for pixels encircled with the encircling lines in t' frame has abnormal values (outliers). Such abnormal values of the shift information (u, v) are mainly caused by errors of pattern matching processing.

Here, in t'+1 frame, the tracking point left from the another vehicle 38 is tracked continuously. That is, if an abnormal value is once generated in the shift information (u, v), the tracking point is not modified (the tracking point does not return to the another vehicle 38). This is because the shift information (u, v) (optical flow) is calculated over temporally successive frames, thereby being dependent on the shift information (u, v) calculated in the past.

As described above, the shift information (u, v) calculated by the shift information calculation section 28 and the parallax information d calculated by the parallax information calculation section 30 may be abnormal values due to errors. Thus, the determination section 34 determines whether or not the shift information (u, v) and the parallax information d have abnormal values based on the differences between both the shift information (u, d) and the parallax information d and the predicted value (Expression 13) calculated by the calculation section 32.

Specifically, the determination section 34 determines whether or not the shift information (u, v) has an abnormal value based on the difference between the shift information (u, v) calculated by the shift information calculation section 28 and the prediction shift information, which is obtained from the predicted value calculated by the calculation section 32 and corresponds to the shift information (u, v). In addition, the determination section 34 determines whether or not the parallax information d has an abnormal value based on the difference between the parallax information d calculated by the parallax information calculation section 30 and the prediction parallax information, which is obtained from the calculated by the calculation section 32 and corresponds to the parallax information d.

That is, the determination section 34 uses the residual error (Expression 16) between observation values calculated when the calculation section 32 updates the Kalman filter, and the predicted values.

$$g_t = \begin{bmatrix} g_{u'_t} \\ g_{v'_t} \\ g_{d'_t} \end{bmatrix} = \begin{bmatrix} u'_t \\ v'_t \\ d'_t \end{bmatrix} - J_t \tilde{x}_t \quad \text{[Expression 23]}$$

$g_{u'_t}, g_{v'_t}$: the differences between the shift information and the prediction information $g_{d'_t}$: the difference between the parallax information and the prediction parallax information Then, when each of the differences between the shift information and the prediction information and the difference between the parallax information and the prediction parallax information is respectively larger than predetermined threshold values $Th_u$, $Th_v$, $Th_d$, the determination section 34 determines that each of the observation values (parallax information d, shift information (u, d)) is an abnormal value.

$$g_{u'_t} > Th_u \quad \text{[Expression 24]}$$

$$g_{v'_t} > Th_v \quad \text{[Expression 25]}$$

$$g_{d'_t} > Th_d \quad \text{[Expression 26]}$$

That is, when at least one of Expression 24 and Expression 25 is satisfied, the determination section 34 determines that the shift information (u, v) has an abnormal value. In addition, when Expression 26 is satisfied, the determination section 34 determines that the parallax information d has an abnormal value. As the threshold values $Th_u$, $Th_v$, $Th_d$, fixed values are used which are obtained by a simulation, an experiment, or the like.

Note that the fixed values are not necessarily required as the threshold values. For example, the parallax information d of a distant object is significantly influenced by noise of the taken image, or the like. The error in the calculated parallax information d also becomes larger easily. As a result, when a fixed threshold value is used, the determination section 34 may always determine that the parallax information d is an abnormal value.

Thus, to perform the determination considering variations of the observation values and the predicted values, threshold values that are variables may be used instead of the threshold values that are fixed values.

That is, the threshold value may be adjusted (changed) by using elements of $S_t$, which is the covariance matrix of the residual error shown in Expression 17.

$$S_t = J_t \tilde{P}_t J_t^T + R = \text{cov}(g_t) \quad \text{[Expression 27]}$$

Then, in the following case, the determination section 34 determines that the observation value is an abnormal value.

$$g_{u'_t} > \sigma_{g_{u'_t}} \times Th'_u, \quad \text{[Expression 28]}$$

$\sigma^2_{g_{u'_t}}$: the value of 0 row and 0 column of $S_t$ $$g_{v'_t} > \sigma_{g_{v'_t}} \times Th'_v, \quad \text{[Expression 29]}$$

$\sigma^2_{g_{v'_t}}$: the value of 1 row and 1 column of $S_t$ $$g_{d'_t} > \sigma_{g_{d'_t}} \times Th'_d, \quad \text{[Expression 30]}$$

$\sigma^2_{g_{d'_t}}$: the value of 2 row and 2 column of $S_t$

That is, when at least one of Expression 28 and Expression 29 is satisfied, the determination section 34 determines that the shift information (u, v) has an abnormal value. In addition, when Expression 30 is satisfied, the determination section 34 determines that the parallax information d has an abnormal value.

If the determination section 34 determines that any of the observation values is an abnormal value, the correction section 36 corrects the estimated value calculated by the calculation section 32. In contrast, if none of the observation values is an abnormal value, the correction section 36 does not correct the estimated value calculated by the calculation section 32.

Here, the correction section 36 corrects the estimated value with different methods between a case where it is determined that the shift information (u, v) is an abnormal value and a case where it is determined that the parallax information d is an abnormal value.0

(Regarding a Case where it is Determined that the Shift Information is an Abnormal Value)

Figure 3:
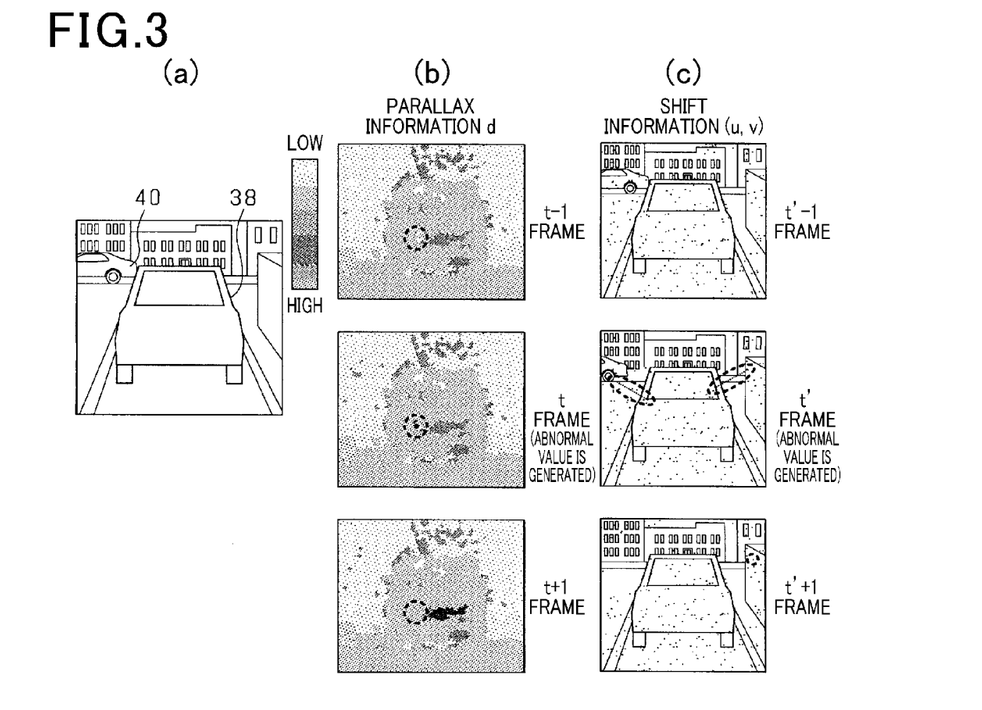
Figure 4:
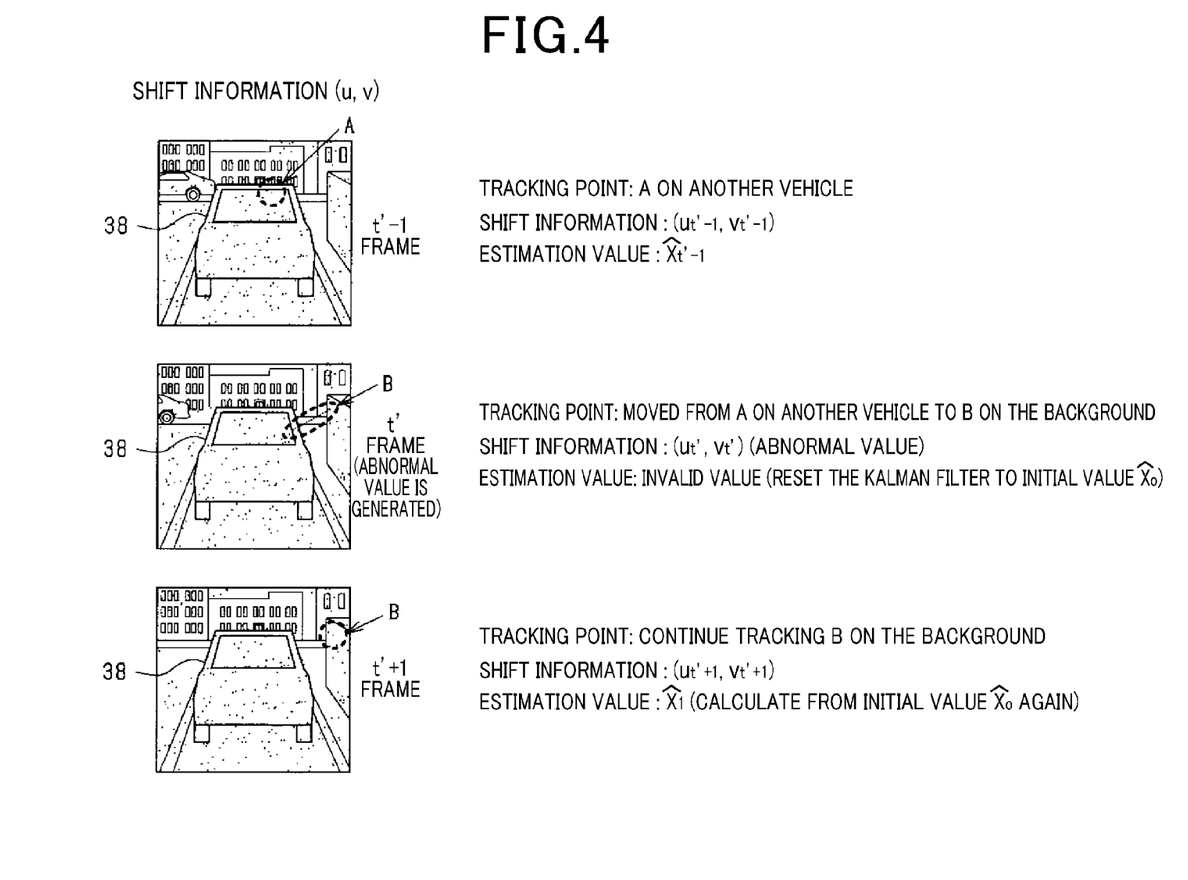
FIG. 4 is a view illustrating a case where an abnormal value is generated in the shift information, and an estimated value is corrected.

First, with reference to FIG. 4, a method is described by which the correction section 36 corrects the estimated value if it is determined that the shift information (u, v) is an abnormal value. Note that the images shown in FIG. 4 illustrate the shift information (u, v) calculated by the shift information calculation section 28, and are the same as those described in FIG. 3(*c*).

As shown in FIG. 4, until t'−1 frame, tracking the portion (tracking point A) indicated by an encircling line in the figure (shift information) is performed normally. Hence, the estimated value calculated by the calculation section 32 is a value estimated by observing the tracking point A on the another vehicle 38.

When a tracking error occurs in t' frame, the tracking point has shifted from A on the another vehicle 38 to B on the background (side wall). That is, the shift information (u, v) in t' frame calculated by the shift information calculation section 28 becomes an abnormal value satisfying Expression 24 or Expression 25 (alternatively, Expression 28 or Expression 29). In this case, the estimated value regarding the tracking point B in t' frame calculated by using the estimated value regarding the tracking point A in t'−1 frame becomes an error value obtained by tracking a different object.

Thus, when the shift information (u, v) is an abnormal value, the correction section 36 cancels (voids) the estimated value in t' frame calculated by the calculation section 32 and resets the Kalman filter to the initial state. In this manner, when a tracking error occurs, the shift information (u, v) is not thereafter corrected to a normal value. Hence, the correction section 36 resets the estimated value to the initial value of Expression 21.

When the shift information (u, v) is an abnormal value, tracking the present pixel becomes invalid. Hence, the correction section 36 sets an invalid value as an output of the object estimation apparatus 10. That is, as an estimated value regarding the pixel whose shift information (u, v) is determined as an abnormal value, an invalid value is output. Then, the estimation regarding the present pixel ends.

Note that, after the Kalman filter is reset to the initial state, tracking the tracking point B is continued. Hence, in t'+1 frame, the calculation section 32 calculates the estimated value regarding the tracking point B by using the above-described initial value. Then, in subsequent frames, the estimated value regarding the tracking point B is calculated.

Note that if it is determined that the shift information (u, v) is not an abnormal value, the correction section 36 sets the estimated value calculated by the calculation section 32 to an output of the object estimation apparatus 10 without correcting the estimated value.

(Regarding a Case where it is Determined that the Parallax Information is an Abnormal Value)

Figure 5:
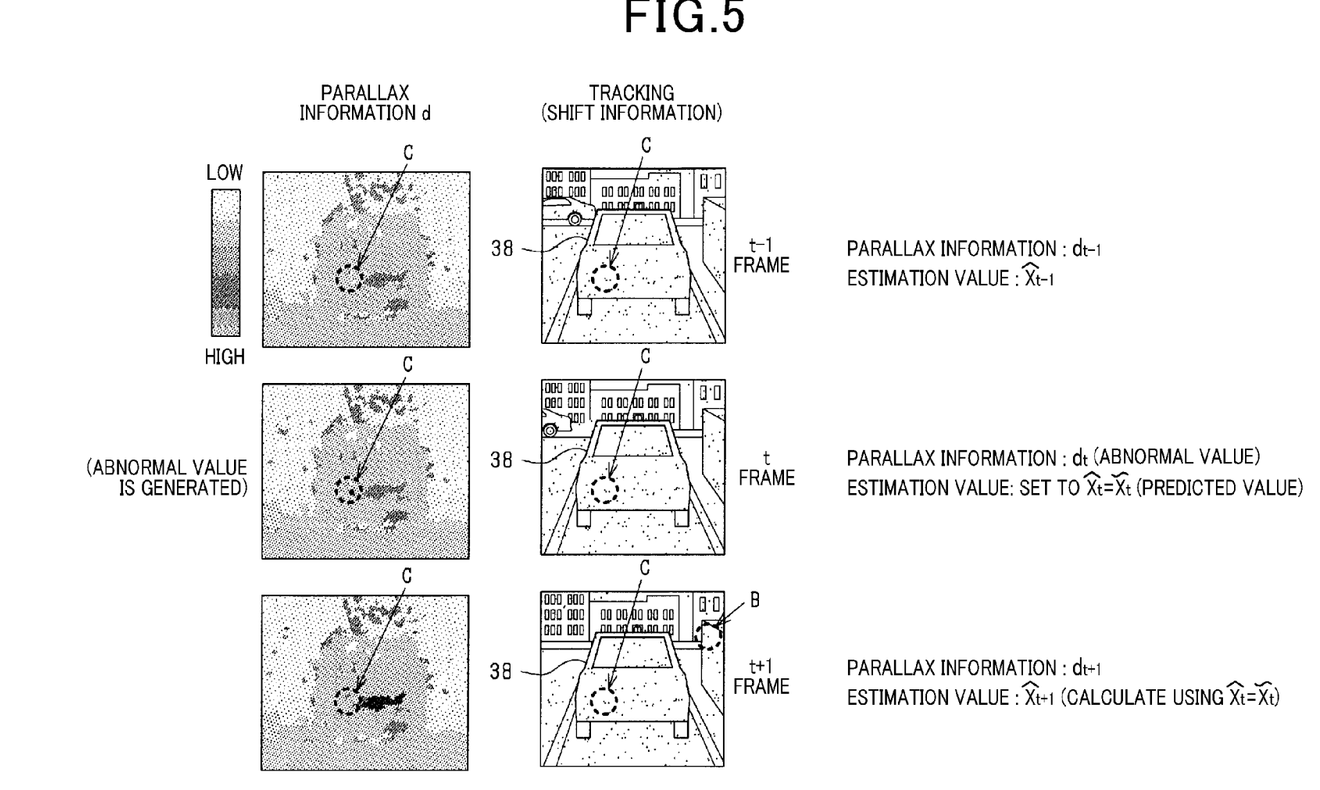
FIG. 5 is a view illustrating a case where an abnormal value is generated in the parallax information, and an estimated value is corrected.

Next, with reference to FIG. 5, a method is described by which the correction section 36 corrects the estimated value if it is determined that the parallax information d is an abnormal value. Note that images shown at the left side in FIG. 5 illustrate the parallax information d calculated by the parallax information calculation section 30, and are the same as those described in FIG. 3(b). In addition, images shown at the right side in FIG. 5 illustrate tracking in the frame corresponding to the images at the left side (shift information). Note that circular encircling lines in the figure indicate the same portion (tracking point C) of the object. In t frame, the parallax information d is an abnormal value. Note that the shift information (u, d) is assumed to be appropriately calculated in all the frames. That is, tracking regarding the tracking point C is accurately performed.

In t−1 frame, the parallax information d is correctly calculated, and the estimated value calculated by the calculation section 32 is also appropriate. Hence, the correction section 36 sets the estimated value calculated by the calculation section 32 as an output.

In t frame, although tracking is performed normally, an error is generated in the parallax information d. That is, the parallax information d in t frame calculated by the parallax information calculation section 30 is an abnormal value satisfying Expression 26 (or Expression 30).

In this case, it can be considered that the predicted value obtained by Expression 13 expresses the state of the object more correctly (closer to the true value) than the estimated value (Expression 19) calculated by using the parallax information d, which is an abnormal value. Thus, if it is determined that the parallax information d is an abnormal value, the correction section 36 cancels the estimated value calculated from Expression 19, and uses the predicted value obtained by Expression 13 as the estimated value. Then, the correction section 36 sets the estimated value corrected to the predicted value as an output of the object estimation apparatus 10.

In t+1 frame, the parallax information d is modified to calculate an appropriate value. In this case, the correction section 36 uses the estimated value calculated by the calculation section 32 without correction. That is, in t+1 frame, the estimated value is used which is calculated by the calculation section 32 by using the estimated value (predicted value) obtained in t frame, without change. Then, the correction section 36 sets the present estimated value as an output.

Figure 6:
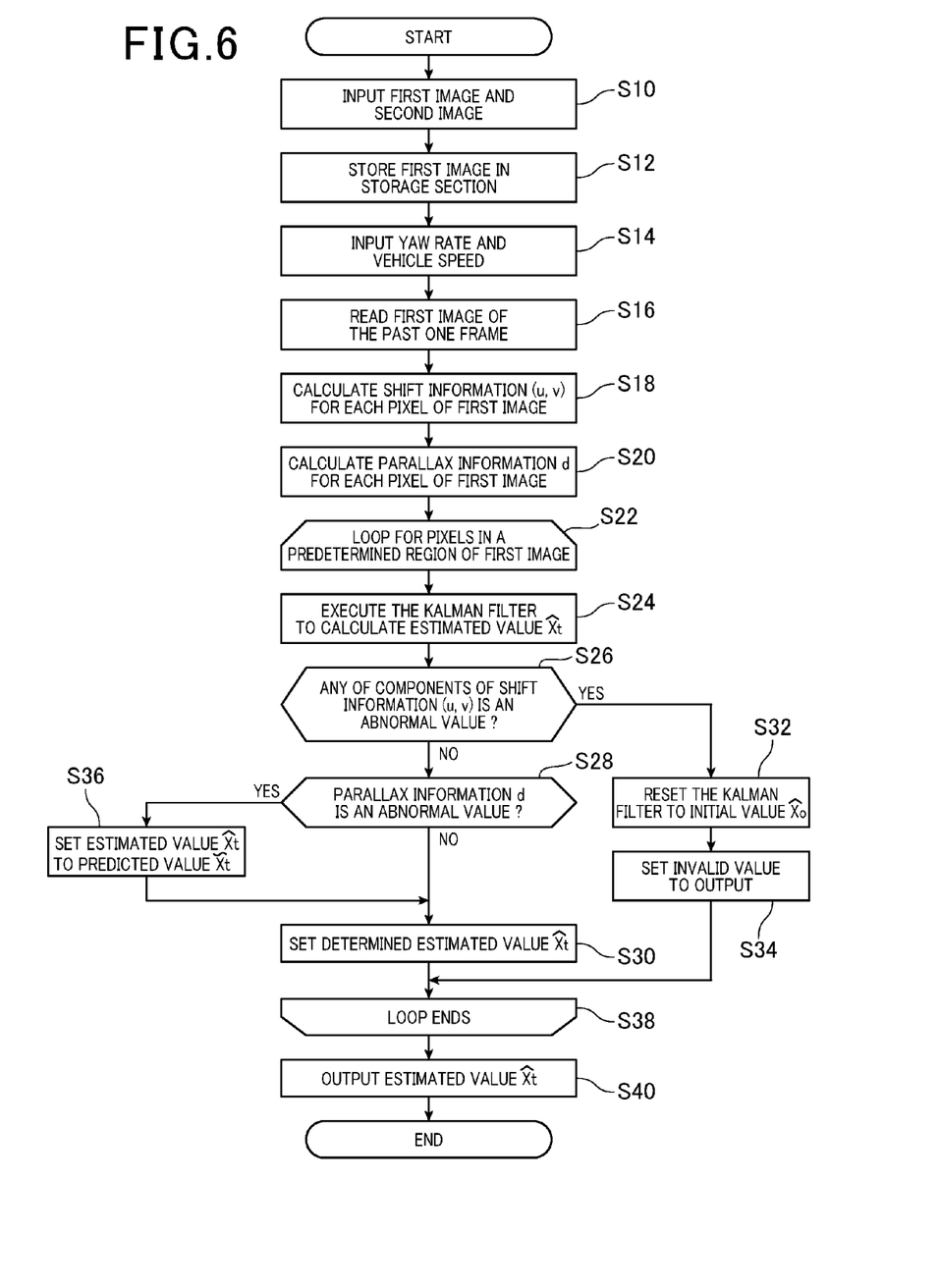
FIG. 6 is a flowchart of a control flow where a state of the object is estimated by an object estimation method according to the embodiment.

Next, an estimation method performed by the object estimation apparatus 10 of the present embodiment will be described with reference to a flowchart in FIG. 6. Note that the flowchart in FIG. 6 is a control flow where a state of the object is estimated by the object estimation apparatus 10 in a given frame (t frame).

The first camera 16 and the second camera 18 (image taking section 12) take images of a view ahead of and in the traveling direction of the automobile to respectively obtain the first image and the second image. The first image and the second image obtained by the image taking section 12 is input to the object estimation apparatus 10 (input value taking section 24) (step S10).

The shift information calculation section 28 stores the input first image in the storage section (step S12). The first image of t frame stored in the storage section is used when the shift information calculation section 28 calculates the shift information (u, v) in the next frame (t+1 frame).

Next, a yaw rate and a vehicle speed of the automobile obtained by the vehicle information taking section 14 are input to the object estimation apparatus 10 (estimated value taking section 26) (step S14). That is, the yaw rate detected by the yaw rate sensor 20 and the vehicle speed of the automobile detected by the vehicle speed sensor 22 are input to the object estimation apparatus 10.

Next, the shift information calculation section 28 reads the first image of the past one frame (t−1 frame) from the storage section (step S16). Then, the shift information calculation section 28 calculates the shift information (u, v) based on the first image in the present frame (t frame) input from the image taking section 12 and the first image in the past one frame (step S18).

The parallax information calculation section 30 calculates the parallax information d based on the first image and the second image input from the image taking section 12 (step S20). At this time, the parallax information calculation section 30 calculates the parallax information d for each pixel of the first image with reference to the first image. The parallax information d and the shift information (u, v) obtained by the input value taking section 24 are output to the estimated value taking section 26.

The estimated value taking section 26 obtains the estimated value of a state of the object for each pixel in a predetermined region of the first image (step S22 to S38). That is, the calculation section 32 executes the Kalman filter with the predictions (Expression 12 to Expression 14) and the updates (Expression 15 to Expression 20) based on the parallax information d and the shift information (u, v) input from the input value taking section 24 (step S24).

Next, the determination section 34 determines whether or not the shift information (u, v) calculated by the shift information calculation section 28 is an abnormal value (step S26). That is, the determination section 34 determines whether or not components of the shift information (u, v) respectively satisfy Expression 24 and Expression 25 (alternatively, Expression 28 and Expression 29).

Here, when tracking for the present pixel is accurately performed, neither of the components of the shift information (u, v) does not satisfy Expression 24 and Expression 25 (alternatively, Expression 28 and Expression 29). In this case, the determination section 34 determines that the shift information (u, v) calculated by the shift information calculation section 28 is not an abnormal value (No in step S26).

If a negative determination is made in step S26, next, the determination section 34 determines whether or not the parallax information d calculated in step S16 by the parallax information calculation section 30 is an abnormal value (step S28). That is, the determination section 34 determines whether or not the parallax information d satisfies the expression 26 (or expression 30).

Here, when the parallax information d for the present pixel is appropriately calculated, the parallax information d does not satisfy Expression 26 (or Expression 30). In this case, the determination section 34 determines that the parallax information d calculated by the parallax information calculation section 30 is not an abnormal value (No in step S28).

If the determination section 34 determines that neither the shift information (u, v) nor the parallax information d is an abnormal value, the correction section 36 uses the estimated value calculated in step S24 by the calculation section 32, without correction. That is, the correction section 36 sets the estimated value calculated in step S24 as an output of the estimated value of the present pixel, without change (step 30).

Meanwhile, in step S26, when tracking for the present pixel has not been accurately performed, at least one component of the shift information (u, v) satisfies Expression 24, Expression 25 (Expression 28, Expression 29). In this case, the determination section 34 determines that the shift information (u, v) is an abnormal value (Yes in step S26).

If it is determined that the shift information (u, v) is an abnormal value, the correction section 36 resets the Kalman filter to an initial state without using the estimated value calculated in step S25 (step S32). That is, the correction section 36 sets the preset initial value (Expression 21) in the Kalman filter. Then, the correction section 36 sets an invalid value as an output of the estimated value of the present pixel (step S34).

As described above, when the shift information (u, v) calculated by the shift information calculation section 28 is an abnormal value, the correction section 36 cancels the estimated value calculated based on the present shift information (u, v), and voids the estimated value of the present pixel. Hence, using an estimation result concerning the pixel, which has not been appropriately tracked, can prevent an estimated value including a large error from being output.

Meanwhile, in step S28, when an error has been generated in the parallax information d of the present pixel, the parallax information d satisfies Expression 26 (or Expression 30). In this case, the determination section 34 determines that the parallax information d is an abnormal value (Yes in step S28). If it is determined that the parallax information d is an abnormal value, the correction section 36 cancels the estimated value calculated in step S24 by the calculation section 32. Then, the correction section 36 sets the predicted value calculated when the calculation section 32 executes the Kalman filter (refer to Expression 13) to the estimated value (step S36).

That is, when the parallax information d is an abnormal value, the estimated value calculated by the calculation section 32 also includes an error. Hence, the correction section 36 cancels the present estimated value. Then, the correction section 36 sets the predicted value, which is considered to be more correct than the estimated value calculated by the calculation section 32, as the estimated value of the present pixel. Accordingly, even when the parallax information d includes an error, a more proper value is used as the estimated value of the object. Thereby, the reliability of the object estimation apparatus 10 can be increased.

Furthermore, the parallax information d is independently calculated for each frame. Hence, even when the parallax information d of the current frame is an abnormal value, the calculation of the parallax information d in the subsequent frames are not affected. Hence, the correction section 36 does not reset the Kalman filter to the initial state as in the case where the shift information (u, v) is an abnormal value. Successive estimation after the estimation for the present pixel is continued.

The correction section 36 set the predicted value as the estimated value, then sets the present estimated value as an output value of the present pixel (step S30).

When the estimated value for the present pixel is determined, the estimated value taking section 26 performs steps S26 to S36 for the next pixel. Then, when the estimated values for all the pixels present in a predetermined region of the first image are determined (step S38), the estimated value taking section 26 outputs the estimated value set as an output to the drive assist apparatus (step S40), and then completes the process for the current frame.

Experimental Example

Figure 7:
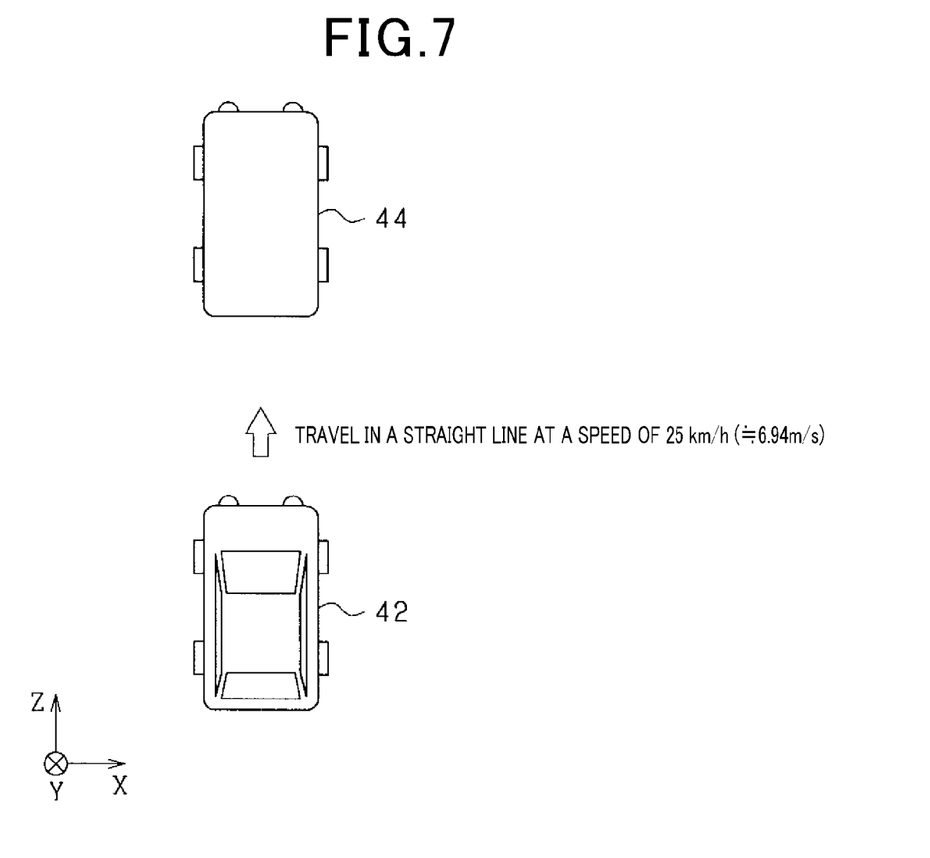
FIG. 7 is a view illustrating an experiment condition of an experimental example.

Next, to confirm the advantages of the object estimation apparatus 10 described above, a demonstration experiment (experimental example) was performed for a case where an abnormal value is generated in the parallax information d. As shown in FIG. 7, it is supposed that an automobile 42 including the object estimation apparatus 10 travels in a straight line on the road at a speed of 25 km/h. Then, in a state where a vehicle (hereinafter, referred to as another vehicle 44) traveling ahead of and in the traveling direction of the automobile 42 is regarded as an object, the position and speed of the another vehicle 44 are estimated. Note that a coordinate system is set as shown in FIG. 7. The center of the lens of the first camera 16 is regarded as the origin position.

Here, the vehicle speed of the vehicle speed sensor 22 is regarded as 7.32 m/s, and the yaw rate of the yaw rate sensor 20 is regarded as 0.15 deg/s (both of which include errors). In this case, the process model of the Kalman filter shown in Expression 1 is expressed as below.

$$\begin{bmatrix} X_t \\ Y_t \\ Z_t \\ Vx_t \\ Vy_t \\ Vz_t \end{bmatrix} = \begin{bmatrix} 1.00 & 0.00 & -2.62 \times 10^{-4} & 1.00 & 0.00 & -2.62 \times 10^{-4} \\ 0.00 & 1.00 & 0.00 & 0.00 & 1.00 & 0.00 \\ 2.62 \times 10^{-4} & 0.00 & 1.00 & 2.62 \times 10^{-4} & 0.00 & 1.00 \\ & & & 1.00 & 0.00 & -2.62 \times 10^{-4} \\ & 0 & & 0.00 & 1.00 & 0.00 \\ & & & 2.62 \times 10^{-4} & 0.00 & 1.00 \end{bmatrix} \begin{bmatrix} X_{t-1} \\ Y_{t-1} \\ Z_{t-1} \\ Vx_{t-1} \\ Vy_{t-1} \\ Vz_{t-1} \end{bmatrix} - \begin{bmatrix} 2.51 \times 10^{-8} \\ 0.00 \\ 0.732 \\ 0.00 \\ 0.00 \\ 0.00 \end{bmatrix} + v \quad \text{[Expression 31]}$$

Herein, as shown below, the covariance matrix Q in Expression 31 uses an adaptation value obtained by a simulation previously performed.

$$Q = \begin{bmatrix} 0.01 & 0.00 & 0.00 & 0.00 & 0.00 & 0.00 \\ 0.00 & 0.0025 & 0.00 & 0.00 & 0.00 & 0.00 \\ 0.00 & 0.00 & 0.01 & 0.00 & 0.00 & 0.00 \\ 0.00 & 0.00 & 0.00 & 0.01 & 0.00 & 0.00 \\ 0.00 & 0.00 & 0.00 & 0.00 & 0.0025 & 0.00 \\ 0.00 & 0.00 & 0.00 & 0.00 & 0.00 & 0.01 \end{bmatrix} \quad \text{[Expression 32]}$$

In addition, as shown below, the covariance matrix Q shown in Expression 9 of the observation model uses an adaptation value obtained by a simulation previously performed.

$$R = \begin{bmatrix} 0.25 & 0.00 & 0.00 \\ 0.00 & 0.25 & 0.00 \\ 0.00 & 0.00 & 1.00 \end{bmatrix} \qquad \text{[Expression 33]}$$

In addition, in the present experimental example, the following value is set as an initial value of the Kalman filter. In the initial value of the estimated value (refer to Expression 21), the position is calculated from the initial value ($u_0$, $v_0$, $d_0$) of the input value. In addition, as the speed, the adaptation value (0.00) is used which is obtained by a simulation previously performed.

$$\hat{x}_0 = \begin{bmatrix} \hat{X}_0 \\ \hat{Y}_0 \\ \hat{Z}_0 \\ \hat{V}_{X0} \\ \hat{V}_{Y0} \\ \hat{V}_{Z0} \end{bmatrix} = \begin{bmatrix} Bu_0/d_0 \\ f_x B v_0/f_y d_0 \\ f_x B/d_0 \\ 0.00 \\ 0.00 \\ 0.00 \end{bmatrix} \qquad \text{[Expression 34]}$$

In addition, regarding the initial value of the covariance matrix of an error of the estimated value shown in Expression 22, elements of part of the covariance matrix are calculated based on the variance ($\sigma_u^2$, $\sigma_v^2$, $\sigma_d^2$) of (u, v, d) determined by a simulation previously performed. In addition, regarding other elements of the covariance matrix, the adaptation value is directly used which is obtained by the simulation.

$$\hat{P}_0 = \begin{bmatrix} \Lambda_{XYZ} & & & 0 \\ & 0.25 & 0.00 & 0.00 \\ 0 & 0.00 & 0.0625 & 0.00 \\ & 0.00 & 0.00 & 0.25 \end{bmatrix} \qquad \text{[Expression 35]}$$

$$\Lambda_{XYZ} = \begin{bmatrix} \frac{\partial X}{\partial u} & \frac{\partial X}{\partial v} & \frac{\partial X}{\partial d} \\ \frac{\partial Y}{\partial u} & \frac{\partial Y}{\partial v} & \frac{\partial Y}{\partial d} \\ \frac{\partial Z}{\partial u} & \frac{\partial Z}{\partial v} & \frac{\partial Z}{\partial d} \end{bmatrix} \begin{bmatrix} \sigma_u^2 & 0.00 & 0.00 \\ 0.00 & \sigma_v^2 & 0.00 \\ 0.00 & 0.00 & \sigma_d^2 \end{bmatrix} \begin{bmatrix} \frac{\partial X}{\partial u} & \frac{\partial X}{\partial v} & \frac{\partial X}{\partial d} \\ \frac{\partial Y}{\partial u} & \frac{\partial Y}{\partial v} & \frac{\partial Y}{\partial d} \\ \frac{\partial Z}{\partial u} & \frac{\partial Z}{\partial v} & \frac{\partial Z}{\partial d} \end{bmatrix}^T \qquad \text{[Expression 36]}$$

$$= \begin{bmatrix} \frac{B}{d_0} & 0 & \frac{-u_0 B}{d_0^2} \\ 0 & \frac{f_x B}{f_y d_0} & \frac{-v_0 f_x B}{f_y d_0^2} \\ 0 & 0 & \frac{-f_x B}{d_0^2} \end{bmatrix} \begin{bmatrix} \sigma_u^2 & 0.00 & 0.00 \\ 0.00 & \sigma_v^2 & 0.00 \\ 0.00 & 0.00 & \sigma_d^2 \end{bmatrix} \begin{bmatrix} \frac{B}{d_0} & 0 & \frac{-u_0 B}{d_0^2} \\ 0 & \frac{f_x B}{f_y d_0} & \frac{-v_0 f_x B}{f_y d_0^2} \\ 0 & 0 & \frac{-f_x B}{d_0^2} \end{bmatrix}^T$$

In addition, in the experimental example, Expression 28 to Expression 30 are used to determine the input value by the determination section 34.

Figure 8:
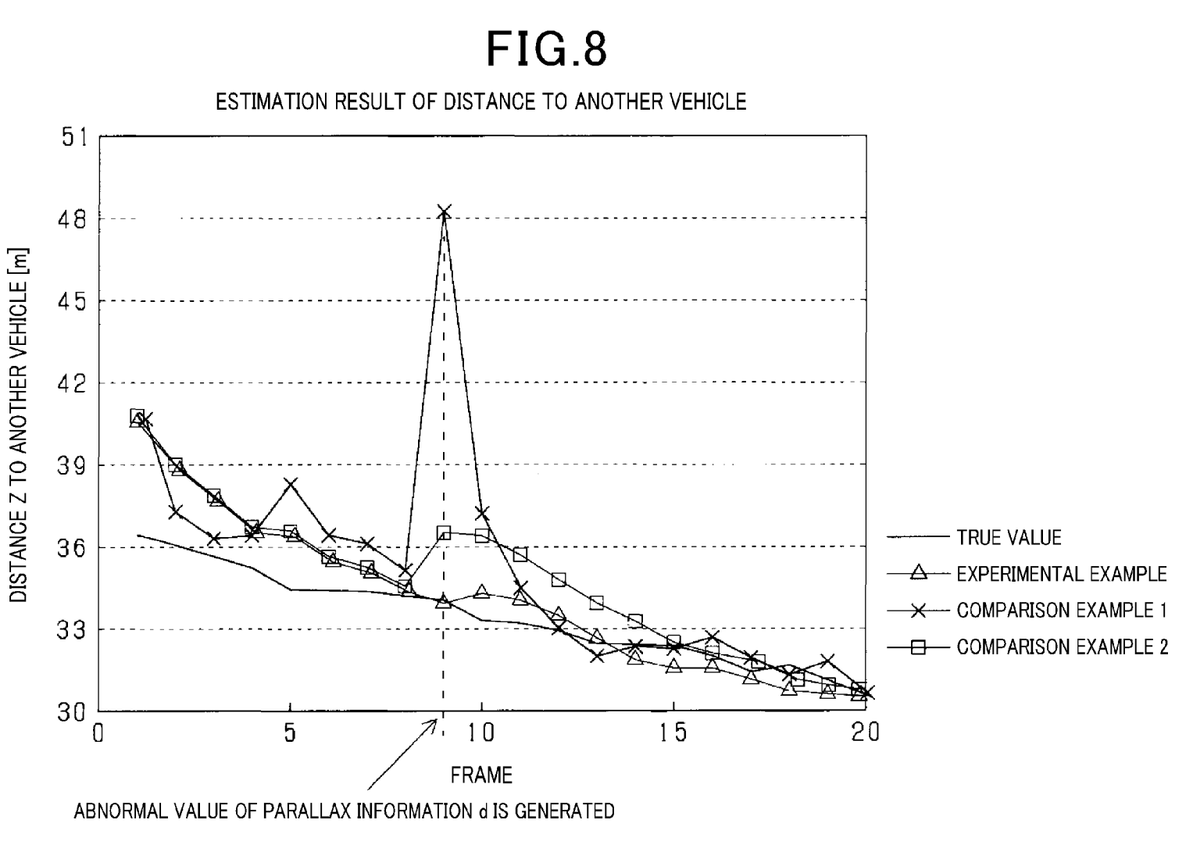
FIG. 8 is a graph of an experimental result of the experimental example.

Under the following conditions, a state of the object is estimated by the object estimation apparatus 10 from 0 frame to 20 frame. Then, an estimation result of the distance (Z) to the another vehicle 44 is illustrated in FIG. 8. Note that, in the experimental example, it is assumed that an abnormal value is generated in the parallax information d in 9 frame. In addition, for comparison, the result of the estimation not using the Kalman filter (comparison example 1) and the result of the estimation under the condition that the correction section 36 does not perform correction even when the parallax information d is an abnormal value (comparison example 2) are illustrated together. Note that true values in the graph indicate actual distances to the another vehicle 44.

As seen from the graph in FIG. 8, it is understood that the comparison example 1 not using a filter is largely displaced from the true value in 9 frame where the parallax information d has become an abnormal value.

In addition, the comparison example 2 not performing the correction of the estimated value traces a path similar to that of the experimental example until 8 frame. However, it is understood that, in 9 frame where the parallax information d becomes an abnormal value, the estimated value calculated from the present parallax information d is used without change, so that the estimation result displaces from the true value. In addition, in 10 frame and later, the estimation results displaced from the true values continue under the influence of the estimate value including the error in 9 frame.

Meanwhile, the experimental example gradually approaches the true value from the start of the estimation, and has an estimation result close to the true value even in 9 frame where the parallax information d becomes an abnormal value. This is because, in 9 frame, not the estimated value calculated by the calculation section 32 but the predicted value is used as the estimated value. In addition, the experimental example has an estimation result close to the true value. As described above, it is understood that the experimental example estimates the distance to the object most accurately.

According to the object estimation apparatus 10 and the object estimation method, the following advantages are provided.

(1) The correction section 36 corrects the estimated value calculated by the calculation section 32 based on the determination result of the determination section 34. Hence, the accuracy of estimated value increases, which can estimate the state of the object accurately.

(2) When the determination section 34 determines that the shift information (u, v) is an abnormal value, the correction section 36 resets the Kalman filter to the initial state (sets the estimated value to the initial value), and sets the estimated value calculated by the calculation section 32 to an invalid value. Hence, the estimated value calculated by using the shift information (u, v), which is an abnormal value, can be prevented from being output without change. That is, voiding the estimated value obtained from a pixel, which has generated a tracking error, can increase the reliability of the object estimation apparatus.

Note that resetting the Kalman filter to the initial state can track a tracking point from the initial state after the tracking point shifts due to the tracking error. That is, the estimation can be continued for a new tracking point different from the tracking point, which has generated an abnormal value.

(3) The parallax information d is calculated for each frame. The abnormal value of the parallax information d is also separately generated by frame. In consideration of the characteristics of such parallax information d, when the parallax information d is an abnormal value, the correction section 36 sets the predicted value, which can be assumed to be a value having accuracy higher than that of the estimated value, as the estimated value. Hence, when the parallax information d is an abnormal value, the error of the estimated value of the object can be smaller.

Furthermore, the correction section 36 does not reset the Kalman filter to the initial state as in the case where an abnormal value is generated in the shift information (u, v). Hence, in the next frame, the estimation for the present pixel can be continued by using the estimated value set in the predicted value.

(4) The determination section 34 determines whether the present shift information (u, v) is an abnormal value based on the difference between the shift information (u, v) calculated by the shift information calculation section 28 and the prediction shift information calculated from the predicted value (refer to Expression 24, Expression 25 or Expression 28, Expression 29). Hence, the determination section 34 can appropriately determine whether or not the shift information (u, v) calculated by the shift information calculation section 28 is an abnormal value.

(5) The determination section 34 determines that the present parallax information d is an abnormal value based on the difference between the parallax information d calculated by the parallax information calculation section 30 and the prediction parallax information calculated from the predicted value (refer to Expression 26 or Expression 30). Hence, the determination section 34 can appropriately determine whether or not the parallax information d calculated by the parallax information calculation section 30 is an abnormal value.

(6) Here, when fixed values shown in Expression 24 to Expression 26 are used as threshold values when the determination section 34 performs determination, the determinations of the shift information (u, d) and the parallax information d can be effectively performed, which can reduce the processing load of the determination section 34.

(7) Meanwhile, when variable values shown in Expression 28 to Expression 30 are used as threshold values, appropriate determination can be made in consideration of variations of the observation value and the estimation value. Hence, for example, when the object is far, and the parallax information d is easily influenced by noise, the threshold values become larger. Thereby, the determination of the abnormal value can be difficult. In contrast, when the object is near, and the parallax information d is slightly influenced by noise, the threshold values become smaller. Thereby, the abnormal value of the parallax information d can be accurately obtained.

(Modifications)

The object estimation apparatus according the embodiment described above can be modified as below.

In the embodiment, as an filter, the Kalman filter is used which estimates a state of the object by repeating the predictions (Expression 12 to Expression 14) and the updates (Expression 15 to Expression 20). However, as the Kalman filter, not only that of the embodiment but also, for example, the unscented Kalman filter or the Particle filter may be used.

In addition, as the filter, not only the Kalman filter as in the case of the embodiment but also, for example, another filter such as anH$^\infty$ filter can be used.

In embodiment, as an image taking means, the image taking section including the first camera and the second camera is exemplified. However, the image taking means may take a plurality of images from different positions, and may include three or more cameras. In addition, in the embodiment, although the parallax information is calculated from the first image and the second image taken by the first camera and the second camera, the parallax information may be calculated from three or more images taken by three or more cameras.

In the present embodiment, a state of an object is estimated by using an image taken by the first camera as a reference image. However, an estimated value may be calculated by using an image taken by the second camera as the reference image. In this case, the second camera is a first imaging means, the first camera is a second imaging means, an image taken by the second camera is a first image, and an image taken by the first camera is a second image.

In the embodiment, shift information is calculated from successive frames of the first image. However the shift information is not necessarily required to be calculated from successive frames but may be calculated from frames arranged in time series. For example, the shift information may be calculated from the frames between which one frame is arranged (i.e. t frame and t+2 frame).

The embodiment illustrates a case where the first camera and the second camera take images of a view ahead of and in the traveling direction of the automobile to estimate an object anterior to the automobile. However, for example, the first camera and the second camera may take images of views in the lateral direction (horizontal direction) or in the posterior direction of the automobile. Hence, states of objects other than those present anterior to the automobile (e.g. posterior vehicle) can be estimated.

The embodiment exemplifies a case in which the object estimation apparatus is installed in an automobile, which is a passenger car. However, the object estimation apparatus can be installed in various vehicles, for example, a large vehicle such as a bus and a truck, and a motorcycle. In addition, the object estimation apparatus may be installed in experiment facilities such as simulation equipment.

In the embodiment, translational motion is calculated by a vehicle speed sensor. However, translational motion of the automobile may be calculated from the first image taken by the first imaging means or the second image taken by the second imaging means. Similarly, rotary motion may also be calculated from the first image or the second image without using a yaw rate sensor.

In the embodiment, the Kalman filter is executed for pixels within a predetermined region of the first image to calculate estimated values. However, the estimated values may be calculated for all the pixels of the first image.

The object estimation apparatus estimates a position and a speed of an object in images based on the images taken by an image taking means from different positions. The object estimation apparatus includes: a shift information taking means that takes temporal shift information of a position of a corresponding pixel from frames arranged in time series in a reference image, which is a reference between the images; a parallax information taking means that takes parallax information of each corresponding pixel from the images with reference to the reference image; an estimated value taking means that estimates estimated values of the position and the speed of the object in three-dimensional space by using a filter based on the shift information taken by the shift information taking means and the parallax information taken by the parallax information taking means; a determination means that determines whether or not each of the shift information taken by the shift information taking means and the parallax information taken by the parallax information taking means is an abnormal value; and a correction means that corrects the estimated value taken by the estimated value taking means based on a determination result of the determination means. The correction means corrects the estimated value taken by the estimated value taking means by using different methods between a case where the determination means determines that the shift information taken by the shift information taking means is an abnormal value and a case where the determination means determines that the parallax information taken by the parallax information taking means is an abnormal value.

The determination means determines whether or not each of the shift information and the parallax information is an abnormal value. Then, the correction means corrects the estimated value taken by the estimated value taking means based on a determination result of the determination means. Hence, when the shift information or the parallax information is an abnormal value, the estimated value, which includes an error, taken by the estimated value taking means is corrected. Thereby, the position and the speed of the object can be accurately estimated.

Here, the correction means changes a method for correcting the estimated value between a case where the determination means determines that the shift information is an abnormal value and a case where the determination means determines that the parallax information is an abnormal value. That is, appropriately correcting the estimated value depending on the type on an input value (shift information, parallax information), which has generated an abnormal value, can estimate the state of the object more accurately.

when the determination means determines that the shift information taken by the shift information taking means is an abnormal value, the correction means voids the estimated value taken by the estimated value taking means and resets the filter to an initial state.

The shift information taking means takes the shift information from frames arranged in time series of the reference image. That is, the shift information is taken depending on the shift information taken in the past. Hence, when the shift information once becomes an abnormal value (tracking error), the shift information taken in the subsequent frames includes a large error due to influence of the shift information of the abnormal value.

Hence, when the shift information is an abnormal value, the correction means sets the estimated value taken by the estimated value taking means to an invalid value and resets the filter to the initial state. That is, for a pixel whose shift information is determined as an abnormal value, the estimation is stopped in the present frame. Hence, the pixel generating a tracking error can be prevented from being estimated as the same object to increase the reliability of the object estimation apparatus. In addition, resetting the filter to the initial state starts tracking the pixel generating the abnormal value. Thereby, the estimated value regarding the pixel can be obtained.

Assuming that the object follows the preset process model, the estimated value taking means takes the predicted values of the position and the speed of the object from the estimated value taken in the past. When the determination means determines that the parallax information taken by the parallax information taking means is an abnormal value, the correction means corrects the estimated value taken by the estimated value taking means to the predicted value taken by the estimated value taking means.

The parallax information taking means takes the parallax information from a plurality of images in the same frame. That is, since the parallax information is independently calculated in terms of time, the parallax information in the past does not affect the parallax information calculated after the past parallax information. Hence, abnormal values of the parallax information are also independently generated in each frame.

When the parallax information is an abnormal value, the correction means corrects the estimated value taken by the estimated value taking means to a predicted value. That is, changing the estimated value, which includes an error, taken by using the parallax information, which is an abnormal value, to the predicted value can make the error of the estimated value in the present frame smaller.

Then, when the parallax information is an abnormal value, the correction means continues the estimation for the present pixel in the subsequent frames without resetting the filter to the initial state. That is, when an abnormal value is generated in the parallax information, the parallax information in the present frame can be set to a predicted value. In addition, the estimation regarding the present pixel can be continued in the subsequent frames.

REFERENCE SIGNS LIST

12 . . . image taking section, 28 . . . shift information calculation section, 30 . . . parallax information calculation section, 32 . . . calculation section, 34 . . . determination section, 36 . . . correction section, d . . . parallax information

The invention claimed is:
1. An object estimation apparatus, which estimates a position and a speed of an object in images based on the images taken by an image taking means from different positions, the object estimation apparatus comprising:
   a shift information taking means that takes temporal shift information of a position of a corresponding pixel from frames arranged in time series in a reference image, which is a reference between the images;
   a parallax information taking means that takes parallax information of each corresponding pixel from the images with reference to the reference image;
   an estimated value taking means that estimates estimated values of the position and the speed of the object in three-dimensional space by using a filter based on the shift information taken by the shift information taking means and the parallax information taken by the parallax information taking means;
   a determination means that determines whether or not each of the shift information taken by the shift information taking means and the parallax information taken by the parallax information taking means is an abnormal value; and a correction means that corrects the estimated value taken by the estimated value taking means based on a determination result of the determination means, wherein
the correction means corrects the estimated value taken by the estimated value taking means by using different methods between a case where the determination means determines that the shift information taken by the shift information taking means is an abnormal value and a case where the determination means determines that the parallax information taken by the parallax information taking means is an abnormal value.

2. The object estimation apparatus according to claim 1, wherein
when the determination means determines that the shift information taken by the shift information taking means is an abnormal value, the correction means voids the estimated value taken by the estimated value taking means and resets the filter to an initial state.

3. The object estimation apparatus according to claim 1, wherein
the estimated value taking means takes predicted values of the position and the speed of the object from the estimated value obtained previously, assuming that the object follows a preset process model, and
when the determination means determines that the parallax information taken by the parallax information taking means is an abnormal value, the correction means corrects the estimated value taken by the estimated value taking means to the predicted value taken by the estimated value taking means.

4. The object estimation apparatus according to claim 3, wherein
the determination means determines whether or not the shift information taken by the shift information taking means is an abnormal value based on a difference between the shift information and predicted shift information, which is calculated from the predicted value taken by the estimated value taking means and corresponds to the shift information.

5. The object estimation apparatus according to claim 3, wherein
the determination means determines whether or not the parallax information taken by the parallax information taking means is an abnormal value based on a difference between the parallax information and predicted parallax information, which is calculated from the predicted value taken by the estimated value taking means and corresponds to the parallax information.

6. An object estimation method, which estimates a position and a speed of an object in images based on the images taken by an image taking means from different positions, the object estimation method comprising:
a step in which a shift information taking means takes temporal shift information of a position of a corresponding pixel from frames arranged in time series in a reference image, which is a reference between the images;
a step in which a parallax information taking means takes parallax information of each corresponding pixel from the images with reference to the reference image;
a step in which an estimated value taking means estimates estimated values of the position and the speed of the object in three-dimensional space by using a filter based on the shift information taken by the shift information taking means and the parallax information taken by the parallax information taking means:
a step in which a determination means determines whether or not each of the shift information taken by the shift information taking means and the parallax information taken by the parallax information taking means is an abnormal value; and
a step in which a correction means corrects the estimated value taken by the estimated value taking means based on a determination result of the determination means, wherein
the correction means corrects the estimated value taken by the estimated value taking means by using different methods between a case where the determination means determines that the shift information taken by the shift information taking means is an abnormal and a case where the determination means determines that the parallax information taken by the parallax information taking means is an abnormal.

7. The object estimation method according to claim 6, wherein
when the determination means determines that the shift information taken by the shift information taking means is an abnormal value, the correction means voids the estimated value taken by the estimated value taking means and resets the filter to an initial state.

8. The object estimation method according to claim 6, wherein
the estimated value taking means takes predicted values of the position and the speed of the object from the estimated value obtained previously, assuming that the object follows a preset process model, and
when the determination means determines that the parallax information taken by the parallax information taking means is an abnormal value, the correction means corrects the estimated value taken by the estimated value taking means to the predicted value taken by the estimated value taking means.

9. The object estimation method according to claim 8, wherein
the determination means determines whether or not the shift information taken by the shift information taking means is an abnormal value based on a difference between the shift information and predicted shift information, which is calculated from the predicted value taken by the estimated value taking means and corresponds to the shift information.

10. The object estimation method according to claim 8, wherein
the determination means determines whether or not the parallax information taken by the parallax information taking means is an abnormal value based on a difference between the parallax information and predicted parallax information, which is calculated from the predicted value taken by the estimated value taking means and corresponds to the parallax information.

* * * * *